United States Patent [19]

Fujioka et al.

[11] Patent Number: 5,228,758
[45] Date of Patent: Jul. 20, 1993

[54] ANTILOCK BRAKE CONTROL SYSTEM WITH LEARNING AND CORRECTION FUNCTION

[75] Inventors: Hideaki Fujioka; Toru Nakaura, both of Itami, Japan

[73] Assignee: Sumitomo Electric Industries, Ltd., Osaka, Japan

[21] Appl. No.: 750,287

[22] Filed: Aug. 27, 1991

[30] Foreign Application Priority Data

Aug. 30, 1990 [JP] Japan ................... 2-230886

[51] Int. Cl.$^5$ ................................ B60T 8/58
[52] U.S. Cl. ................... 303/111; 303/113.5; 364/426.02
[58] Field of Search ....... 364/426.03, 426.02; 303/91, 95-97, 103-105, 108, 111, 113.5, 98, 180

[56] References Cited

U.S. PATENT DOCUMENTS

| 4,338,669 | 7/1982 | Skarvada | 364/426.02 |
| 4,912,744 | 3/1990 | Hurst | 303/109 |
| 4,916,619 | 4/1990 | Walenty et al. | 364/426.02 |
| 4,932,726 | 6/1990 | Iwata et al. | 303/102 X |
| 4,947,332 | 8/1990 | Ghoneim | 364/426.03 |
| 4,984,165 | 1/1991 | Muller et al. | 364/426.02 |
| 4,991,103 | 2/1991 | Lin | 303/106 X |
| 4,999,778 | 3/1991 | Ruhl et al. | 364/426.02 |
| 5,019,984 | 5/1991 | Masaki et al. | 364/426.02 |

FOREIGN PATENT DOCUMENTS

2114052 4/1990 Japan.

Primary Examiner—Robert J. Oberleitner
Assistant Examiner—Alfred Muratori
Attorney, Agent, or Firm—Sandler Greenblum & Bernstein

[57] ABSTRACT

An antilock brake control system with a learning and correction function includes a slippage detector for detecting a slip value representing the slipping of a tire to a road surface. The slip value is compared with a slip threshold, and a locking symptom signal is produced when the slip value exceeds the slip threshold. A brake pressure suppression starts when the locking symptom signal is produced. A slippage learning arrangement is provided for learning, during a learning period from the start of brake pressure suppression until the tire stabilizes, whether a maximum of the slip value during the learning period is within a predetermined range, is greater than the predetermined range, or is less than the predetermined range. The slip threshold is corrected such that when the maximum slip value is greater than the predetermined range, the slip threshold is decreased, and when the maximum slip value is less than the predetermined range, the slip threshold is increased.

7 Claims, 5 Drawing Sheets

Fig. 4

ANTILOCK BRAKE CONTROL SYSTEM WITH LEARNING AND CORRECTION FUNCTION

BACKGROUND OF THE INVENTION

1. Field of the Invention

The present invention relates to an antilock brake control system (ABS), and more particularly, to antilock brake control system equipped with a function for learning and correcting the condition for starting the brake pressure suppression.

2. Description of the Prior Art

An antilock brake control system overrides the driver's operation of the brakes when the brakes ar applied and the tires lock and begin to slip on the road surface to automatically adjust the fluid pressure in the brake cylinder to stop the wheel locking and control the slipping of the tire to the road surface so that the maximum coefficient of friction $\mu$ is obtained therebetween.

Conventional ABS systems define a constant slip threshold and are configured to begin brake pressure suppression based on the single condition of the actual slipping of the tire exceeding this slip threshold.

Figure 5:
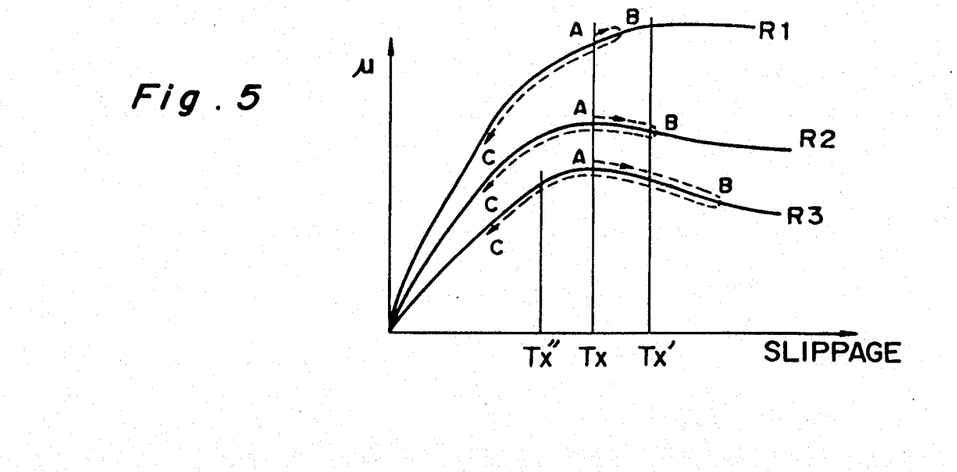
FIG. 5 is a characteristics curve showing the relationship between the slipping characteristics and coefficient of friction $\mu$ of a given road surface.

As shown in FIG. 5, however, because the relationship between the coefficient of friction $\mu$ and the slip characteristics of the road surface is varied, the degree of tire slipping at which the coefficient of friction $\mu$ is greatest differs according to the road surface, and the wheel behavior after the coefficient of friction $\mu$ exceeds this maximum slippage is also varied. For example, while on road surface R1 a relatively constant coefficient of friction $\mu$ is maintained after the maximum value for that road is exceeded, the coefficient of friction $\mu$ decreases slightly and greatly for road surfaces R2 and R3, respectively.

However, because the starting point for brake pressure suppression is determined according to a constant slip threshold Tx in a conventional antilock brake control system, antilock brake control on any road surface is a repetition of steps such that: the suppression of brake pressure starts at point A while tire slipping increases to the "return point" B, after which the locking symptoms are eliminated and tire slipping returns to the level at point C as shown in FIG. 5. On road surface R1, because the starting point A for brake pressure suppression is slightly before the point of maximum coefficient of friction $\mu$, antilock brake control tends to start early, thus preventing attainment of the greatest coefficient of friction $\mu$ for that road surface. On road surface R3, however, because tire slipping increases greatly from the pressure suppression starting point A to the return point B, the maximum time and distance are required for the locking symptoms to be eliminated. It is on road surface R2 that the best antilock brake control is obtained relative to the road surface.

Therefore, an object of the present invention is to provide an antilock brake control device whereby the start of 5 brake pressure suppression can start under continuously ideal conditions even when the condition of the road surface changes. A further object is to provide an antilock brake control device which can, for example, set a slip threshold Tx' for a road surface R1, and set a slip threshold Tx" for a road surface R3.

SUMMARY OF THE INVENTION

The object of the present invention is therefore to provide an antilock brake control system with a function enabling the conditions for starting brake pressure suppression to be learned and the system corrected.

In order to achieve the aforementioned object, an antilock brake control system with a learning and correction function comprises: a slippage output means for outputting a slip value representing the slipping of a tire to a road surface; a slip threshold output means for outputting a slip threshold; a comparing means for comparing said slip value with said slip threshold and for producing a locking symptom signal when said slip value exceeds the slip threshold; a brake pressure suppression start means for starting the brake pressure suppression when said locking symptom signal is produced; a slippage learning means for learning, during a learning period from the start of brake pressure suppression until the tire stabilizes, whether a maximum of said slip value during said learning period is within a predetermined range, is greater than the predetermined range, or is less than the predetermined range; and a slip threshold correction means for correcting said slip threshold such that, when said maximum slip value is greater than said predetermined range, the slip threshold is decreased, and when said maximum slip value is less than said predetermined range, the slip threshold is increased.

In addition, an antilock brake control system with a learning and correction function according to an alternative embodiment of the present invention wherein the brake pressure suppression start means for the rear wheels detects the presence of locking symptoms based on the wheel behavior of the one of the pair of rear wheels with the stronger locking symptoms, and starts brake pressure suppression simultaneously for both wheels (hereinafter referred to as "select low" control).

In this case, correction by the slip threshold correction means is not applied to the rear wheel for which the learning period started later if the learning periods of both rear wheels overlap by any amount.

Brake pressure control is applied whenever locking symptoms are detected when the brakes are operated.

If brake pressure control is applied except the first time, it is learned by the maximum slip learning means whether the tire slipping is greater than or less than a predetermined range, and after the learning period is over the slip threshold is corrected by the slip threshold correction means based on the result of learning.

Because the corrected slip threshold is used in the next brake pressure control sequence, brake pressure control starts at a more appropriate timing. Furthermore, if brake pressure control is again applied, the learning process described above is executed in parallel.

Therefore, if brake pressure control begins again, the further corrected slip threshold is used so that eventually the slip threshold is corrected to that value whereby the maximum slipping of the tires is within the predetermined range during the learning period.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
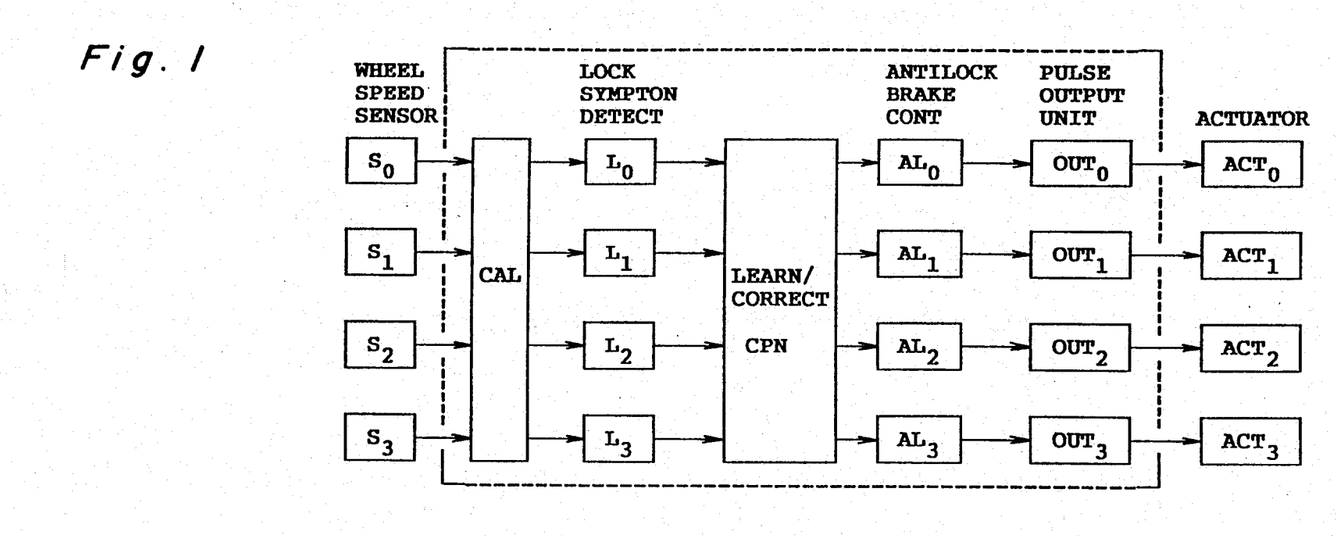
FIG. 1 is a block diagram of an antilock brake control system with a learning and correction function according to the present invention.

Referring to FIG. 1, a block diagram of an antilock brake control system is shown which includes a learning and correction function according to the present invention. The following description of the preferred embodiments concerns specifically an application in front wheel drive vehicles, but the invention can also be applied to rear wheel drive vehicles.

As shown in FIG. 1, the antilock brake control system comprises wheel speed sensors $S_0$–$S_3$ which output a signal according to the rotational velocity of each wheel, a calculator CAL, locking symptom detectors $L_0$–$L_3$, a learning and correction unit CPN, antilock brake controllers $AL_0$–$AL_3$, pressure pulse output units $OUT_0$–$OUT_3$, and actuators $ACT_0$–$ACT_3$ which comprises solenoid valves and adjust the brake pressure according to the pressure pulse.

It is to be noted that in the description of the embodiments hereinafter the suffixed numerals 0, 1, 2, and 3 indicate, respectively, the right front wheel, left front wheel, right rear wheel, and the left rear wheel.

The calculator CAL computes the wheel speed Ws: (where i=0, 1, 2, or 3, hereinafter the same), wheel deceleration $Wd_i$, estimated vehicle speed $Vr_i$, estimated vehicle deceleration $Vd_i$, and slip $Sp_i$ based on the output signal from the wheel speed sensors $S_0$–$S_3$. For example, the estimated vehicle speed $Vr_i$ is calculated using formulae of common knowledge as described in Japanese Patent Laid-Open Publication (unexamined) No. H2-114052, and the estimated vehicle deceleration $Vd_i$ can be determined by differentiating the estimated vehicle speed $Vr_i$.

The locking symptom detectors $L_0$–$L_3$ detect the presence of locking symptoms at each wheel. If locking symptoms are detected for any wheel, brake pressure control is started for that wheel. It is to be noted that while the method whereby locking symptoms are determined to be present functions by determining if the tire slipping Sp exceeds a predetermined slip threshold Thr, other common methods of detecting locking symptoms can also be used.

The learning and correction unit CPN corrects the slip threshold Thr at the final time point in each asynchronous period based on the wheel behavior during the asynchronous periods (to be described below), i.e., during periods approximately equal to the period of brake pressure suppression. For example, if antilock brake control starts and the maximum tire slipping detected during the asynchronous period is less than a first predetermined value $Sp_1$, it is determined that the current antilock brake control is overly sensitive to tire slipping, and therefore corrects the slip threshold Thr at the final time point in the asynchronous period to one level higher.

Conversely, if the maximum tire slipping detected during the asynchronous period is greater than a second predetermined value $Sp_2$ (where $Sp_2 > Sp_1$), it is determined that the current antilock brake control is not sufficiently sensitive to tire slipping, and therefore corrects the slip threshold Thr at the final time point in the asynchronous period to one level lower.

In other words, the starting conditions for brake pressure suppression are corrected by the learning and correction unit CPN so that tire slipping is kept constantly between the values $Sp_1$ and $Sp_2$ regardless of the type or condition of the road surface.

The actual antilock brake control is applied individually by a method of common knowledge to each of the wheels by the antilock brake controllers $AL_0$–$AL_3$, causing a pressurize or depressurize pulse to be output from the pressure pulse output units $OUT_0$–$OUT_3$ according to the result of antilock brake control determination, thus causing the actuators $ACT_0$–$ACT_3$ to increase or decrease the hydraulic brake pressure. It is to be noted that the components within the dot-dash line box in FIG. 1 may be contained within a microcomputer and some electric circuits, the operating procedure of which is described hereinbelow with reference to the flow charts in FIGS. 2a and 2b and the wave diagram in FIG. 3. It is to be noted that the sequence from start to and the same sequence is applied to each of the four tires.

Figure 2A:
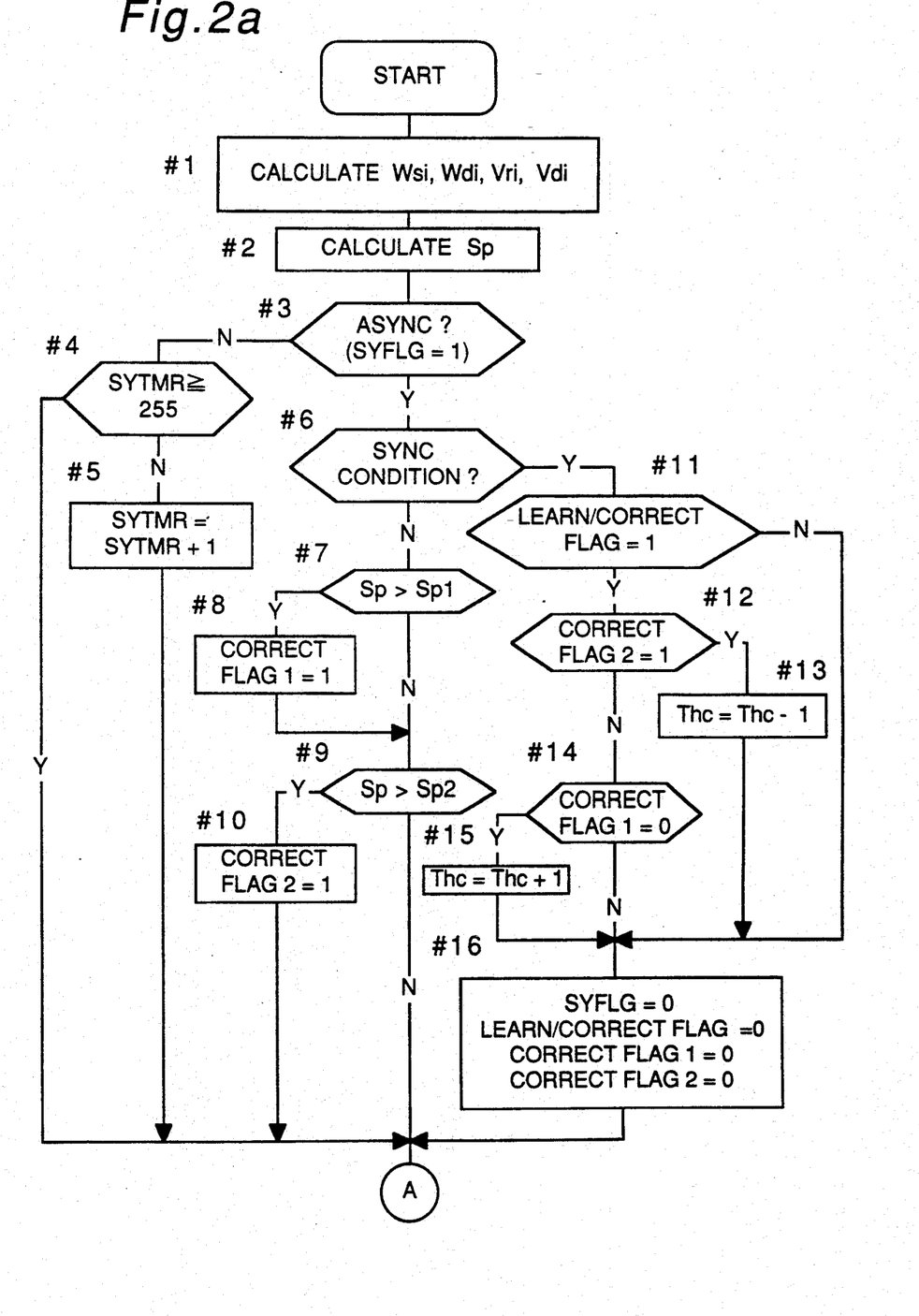
FIGS. 2a and 2b are flow charts.

Referring to FIG. 2a, the wheel speed $Ws_i$, wheel deceleration $Wd_i$, estimated vehicle speed $Vr_i$, and estimated vehicle deceleration $Vd_i$ are computed by the calculator CAL for one wheel at Step #1. Then at Step #2 the slip Sp for that tire is computed using the following equation:

$$Sp = Vr_i - Ws_i \tag{1}$$

Note that if $Vr_i - Ws_i < 0$, then it is assumed that Sp=0. At Step #3 it is determined whether the procedure is within an asynchronous period, i.e., whether the synchronization flag SYFLG=1. If it is not an asynchronous period, the procedure advances to Step #4; if it is an asynchronous period, the procedure advances to Step #6. Note that as will be described later the asynchronous period starts when it is determined that antilock brake control is required for one wheel and ends when it is determined that the tire has reached a stable synchronized condition.

At Step #4, it is determined whether the synchronized timer SYTMR has incremented to an upper limit, e.g., 255; if it has, the procedure advances to Step #17, and if it is less than the upper limit the synchronized timer SYTMR is incremented at Step #5 and then the procedure advances to Step #17.

At Step #6 it is determined whether the conditions of synchronized behavior are met, i.e., whether the wheel determined to be asynchronous has reached a stable condition. The wheel is determined to have stabilized if equations (2) and (3) below are both satisfied, specifically:

$$Sp \leq 1/6 \text{ estimated vehicle speed } Vr_i + 5 \tag{2}$$

and $$0 \leq \text{wheel deceleration } Wd_i \leq 1 \text{ g} \tag{3}$$

If the wheel has not stabilized and is determined to not be synchronized, the procedure advances to Step #7. Then it is determined whether slip Sp is greater than a first predetermined $Sp_1$; if it is, a first correct flag 1 is set at Step #8. At Step #9 it is determined whether slip Sp is greater than a second predetermined $Sp_2$ (where $Sp_2 > Sp_1$); if it is, a second correct flag 2 is set at Step #10, and if it is not the procedure advances to Step #17.

However, if equations (2) and (3) are satisfied and it is determined that the tires have stabilized, the procedure advances to Step #11 and it is determined whether the learning and correction enable flag is set. If the learning and correction enable flag is not set, the procedure advances to Step #16, but if the flag is set, the procedure advances to Step #12.

At Step #12 it is determined whether correction flag 2 is set; if it is, the correction value Thc is lowered one level at Step #13 and the procedure advances to Step #16. However, if the flag is not set, the procedure advances to Step #14.

At Step #14 it is determined whether correction flag is reset; if it is reset, the correction value Thc is increased one level at Step #15 and the procedure advances to Step #16, but if the flag is not reset then the procedure advances directly to Step #16. Thus, the preparations for correcting the slip threshold Thr are completed at Steps #13 and #15.

At step #16 the synchronization flag SYFLG, the learning and correction enable flag, correction flag 1, and correction flag 2 are all reset.

Figure 2B:
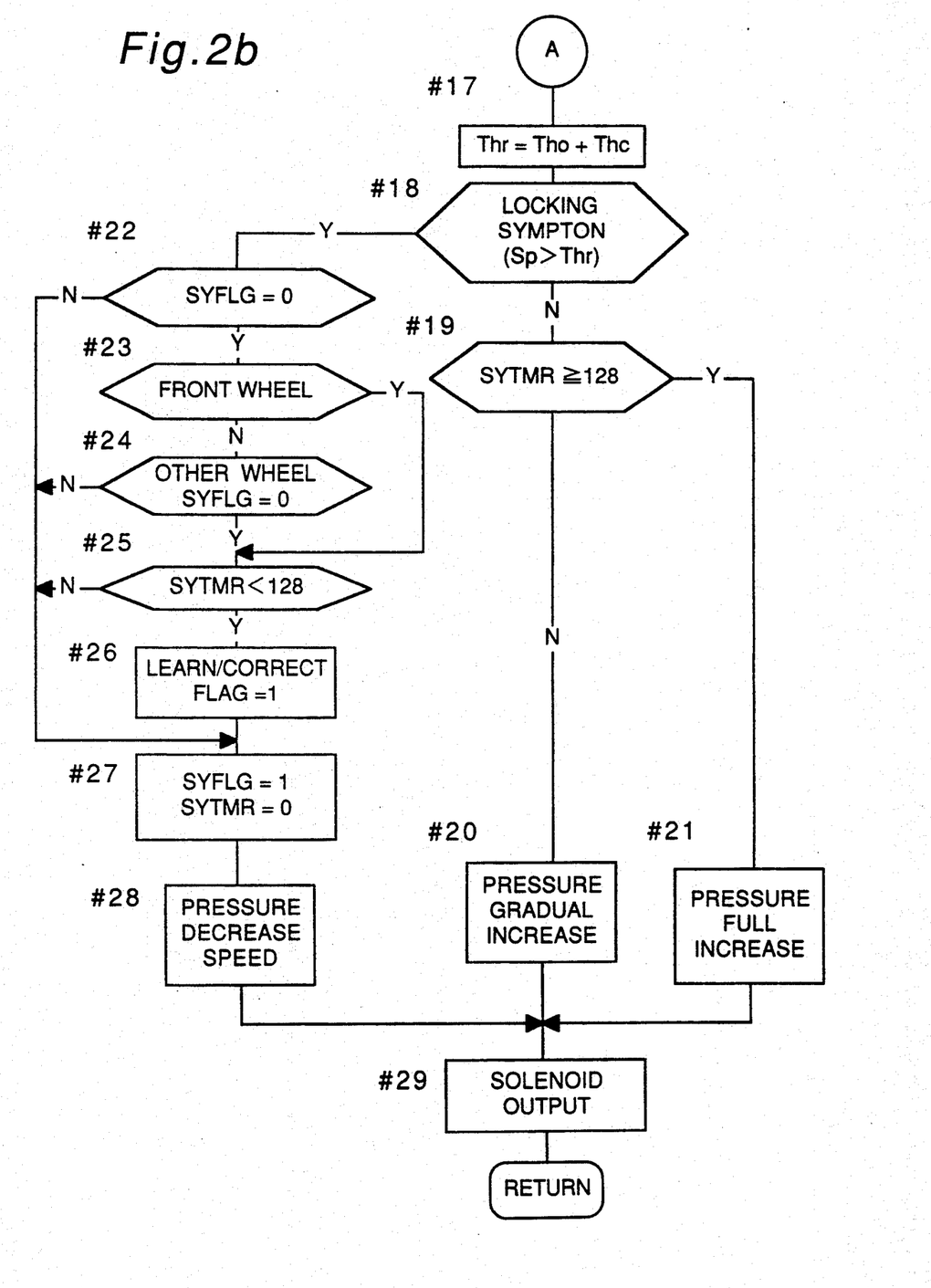

In FIG. 2b the slip threshold Thr is obtained at Step #17 by applying the equation $$Thr = Tho + Thc \quad (4)$$

where the reference value Tho is defined as $$Tho = 1/16 Vr_i + 3 \quad (5)$$

It will be known to those skilled in the art that the equations shown here are simply examples and that other equations may also be applied.

At Step #18 it is determined whether there are any locking symptoms present. Note again that while locking symptoms are determined to be present in the embodiment described herein at that point when the slip Sp exceeds a slip threshold Thr, other methods of common knowledge may also be applied and other conditions may be combined. Furthermore, it is to be noted that the present embodiment is constructed to determine the locking symptoms of both rear wheels based on the behavior of the rear wheel in which locking symptoms are strongest.

If it is determined that locking symptoms are present, the procedure advances to Step #22 and the reset status of the synchronized flag SYFLG is evaluated. If the flag is set, the procedure advances to Step #26, and if the flag is reset (SYFLG=0) the procedure advances to Step #23.

At Step #23 it is determined whether the wheel currently being evaluated is a front wheel. If it is, the procedure advances to Step #25 where it is determined whether the synchronized timer SYTMR is less then a predetermined midrange value, e.g., 128. If it is, the procedure advances to Step #26 at which the learning and correction enable flag is set. However, at Step #23, if a rear wheel is being evaluated the procedure advances to Step #24 and it is determined whether the other rear wheel is synchronized. If the other rear wheel is synchronized, the procedure advances to Step #25 where it is checked whether the synchronized timer SYTMR is less then 128. If it is, the learning and correction enable flag is set; if the other rear wheel is not synchronized, Steps #25 and #26 are skipped and the procedure advances to Step #27.

In other words, Steps #23 and #24 prevent the learning and correction enable flag from being set for the one rear wheel when locking symptoms are detected therefor but locking symptoms had previously been detected for other rear wheel. In general, select low control is frequently used for the rear wheels so that both rear wheels are controlled based on the behavior of the rear wheel with the stronger locking symptoms. In other words, if it is determined that the brake pressure must be reduced for one wheel, a pressure reduce command is also output for the other rear wheel even if locking symptoms thereof have not been detected. Therefore, if it is assumed that after one rear wheel shows evidence of locking symptoms the other rear wheel also evidences locking symptoms, then a brake pressure reduce command has already been output when this other rear wheel becomes asynchronous. Because it is therefore meaningless to modify the correction value Thc of this other rear wheel, the learning and correction enable flag is not set.

At Step #27 the synchronized flag SYFLG is set and the synchronized timer SYTMR is reset to zero. Brake pressure suppression then starts at Step #28 and the pressure reduce speed is set. The pressure reduce pulse is output based on this setting to regulate the pressure reduction of the hydraulic brake pressure.

However, if at Step #18 it was determined that no locking symptoms are present, the procedure advances to Step #19 and the value of the synchronized timer SYTMR is compared with a predetermined midrange value, e.g., 128, to determine if the timer count is greater. If the timer is less than this predetermined midrange value 128, a gradual pressure increase command is output at Step #20, but if the timer is greater than this or equal predetermined midrange value 128, then antilock brake control has ended and a full pressure increase command is output at Step #21, i.e., the brakes are pressurized according to the brake pedal operation by the driver.

At Step #29 a solenoid command is output based on the setting received from Steps #28, #20, or #21, and the actuator, which comprises solenoids, is driven.

The actual operation of this system is described hereinbelow with reference to the graph in FIG. 3.

Figure 3:
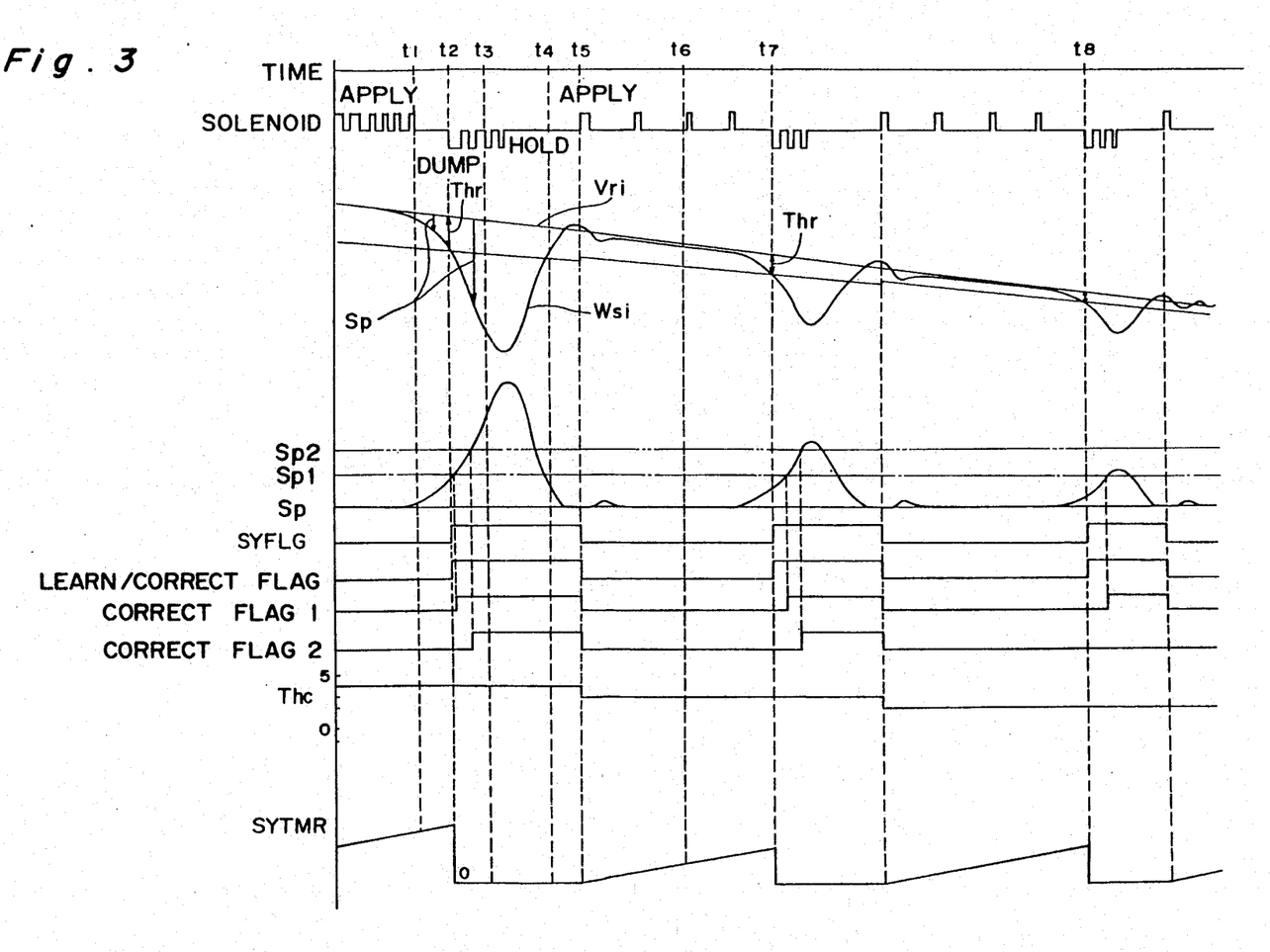
FIG. 3 is a waveform diagram illustrating the actual antilock brake control system operation.

At time t as shown in FIG. 3, the brake pressure is increasing and tire slipping is beginning to increase, though it is still approximately zero, because the solenoid signal is in a pressure increase state. Therefore, the control sequence repeated at time $t_1$ is Steps #1, 2, 3, 4, 5, 17, 18, 19, 20, and 29. In other words, at this time a NO is returned by the asynchronous evaluation of Step #3 because brake pressure suppression has not started, and a NO is also returned at Step #4 because the count of the synchronized timer SYTMR is less than 255. In addition, a NO is also returned at the locking symptoms evaluation in Step #18 because the slip Sp level has not exceeded the slip threshold Thr.

It is to be noted that in FIG. 3 because tire slipping is expressed as:

$$slip\ Sp = estimated\ vehicle\ speed\ Vr_i - wheel\ speed\ Ws_i,$$

slip Sp represents the difference between the estimated vehicle speed $Vr_i$ and the wheel speed $Ws_i$, and if the slip threshold is expressed relative to the estimated vehicle speed $Vr_i$ it is set at a level equal to the Thr subtracted from the estimated vehicle speed $Vr_j$.

In addition, because the synchronized timer SYTMR count is less than 128, the procedure advances from Step #19 to Step #20, causing a slight pressure increase command to be set.

Next at time $t_2$, locking symptoms are determined to be present, thus causing brake pressure suppression to start and an asynchronous period to begin.

Therefore, if an asynchronous period is not set for one of the front wheels or for both of the rear wheels and the control wheel is one of the rear wheels, the control sequence executed once at time $t_2$ is Steps #1, 2, 3, 4, 5, 17, 18, 22, 23, (24) 25, 26, 27, 28 and 29. In this sequence the learning and correction enable flag is set at Step #26, the synchronized has begun, and the synchronized timer SYTMR is reset. At Step #28 the pressure reduction speed is set. 15 It is to be noted that at time $t_2$ if the control wheel is one of the rear wheels and an asynchronous state has already been set for one of the rear wheels, the control sequence is Steps #1, 2, 3, 4, 5, 17, 18, 22, 23, 24, 27, 28, and 29. In other words, the learning and correction enable flag is not set and the synchronized flag SYFLG is set, and the synchronized timer SYTMR is reset.

Because after time $t_2$, for example at time $t_3$, the asynchronous state has started, it is determined whether the slip Sp is less than a first predetermined value $Sp_1$, between the first predetermined value $Sp_1$ and a second predetermined value $Sp_2$, or is greater than this second predetermined value $Sp_2$. Therefore, the control sequence at time $t_3$ is a loop through Steps #1, 2, 3, 6, 7, (8), 9, (10), 17, 18, 22, 27, 28, and 29. If the slip Sp is less than the first predetermined value $Sp_1$, neither of correction flags 1 or 2 is set; if between the first and second predetermined values $Sp_1$ and $Sp_2$, only correction flag 1 is set; if greater than the second predetermined value $Sp_2$, both correction flags 1 and 2 are set.

Because in FIG. 3 the slip Sp is greater than the second predetermined value $Sp_2$ at time $t_3$, both correction flags 1 and 2 are set. Because it may be concluded that the slip Sp becomes greater than the second predetermined value $Sp_2$ because the brake pressure suppression start timing is delayed, the slip threshold Thr is corrected to advance the antilock brake control timing at time $t_5$ as will be described hereinafter.

Furthermore, because the locking symptoms continue at this time $t_3$, control advances from Step #18 to #22 and through #27 to Step #28, repeating the pressure reduction loop to eliminate the locking symptoms.

At some point around time $t_4$ the locking symptoms are eliminated and the wheel speed $Ws_i$ has approached the estimated vehicle speed. The control sequence at this time is therefore a loop through Steps #1, 2, 3, 6, 7, 9, 17, 18, 19, 20, and 29, with the slight pressure increase command set at Step #20.

At time $t_3$ it is detected that the conditions indicating an escape from the asynchronous wheel state have been satisfied; the correction value Thc for the slip threshold Thr is therefore adjusted according to the settings of the correction flags 1 and 2, and the asynchronous state ends. Thus, the control sequence at time $t_5$ goes once through Steps #1, 2, 3, 6, 11, 12, 13 (or 14, 15), 16, 17, 18, 19, 20, and 29. Because in this sequence the maximum slip Sp detected during the asynchronous period exceeded the second predetermined value $Sp_2$, both of the correction flags 1 and 2 are set; control therefore runs through Steps #12, 13, and 16, and the correction value Thc is lowered one level.

It is to be noted that if the maximum slip Sp detected during the asynchronous period is less than the first predetermined value $Sp_1$, neither of the correction flags 1 and 2 will be set, resulting in a control sequence of Steps #12, 14, 15, and 16 with the correction value Thc to be increased one level. Furthermore, if the maximum slip Sp detected during the asynchronous period is between the first and second predetermined values $Sp_1$ and $Sp_2$, only correction flag 1 is set. The resulting control sequence is Steps #12, 14, and 16, and the current correction value Thc is kept.

It follows that if the learning and correction enable flag is not set at time $t_2$, no correction is applied regardless of the state of the correction flags 1 and 2.

At Step #16, the synchronized flag SYFLG, learning and correction enable flag, and correction flags 1 and 2 are all reset to prepare for control in the next asynchronous state. Then at Step #17 the slip threshold Thr is corrected (decreased one level), and a slight brake pressure increase continues at Step #20.

After time $t_5$, e.g., at time $t_6$, the synchronized timer SYTMR is incremented with control looping through the slight pressure increase operation (Step #20) until the count reaches a predetermined value (e.g., 128). Thereafter, i.e., after antilock brake control has ended, the brakes are pressurized according to the operation of the brake pedal by the driver (Step #21). Thus, the control sequence at time $t_6$ is Steps #1, 2, 3, 4, 5, 17, 18, 19, 20 (or 21), and 29.

At time $t_7$ brake pressure suppression starts again and an asynchronous state is entered. This time, however, because the slip threshold Thr is one level lower than during the previous operation, antilock brake control starts sooner, i.e., when the slip Sp reaches a smaller value. Thus, the system operates to prevent the slip Sp from exceeding a required level (second predetermined value $Sp_2$).

It is to be noted that because the maximum slip Sp detected during the asynchronous period of brake pressure suppression which started from time t; still exceeds the second predetermined value $Sp_2$, the slip threshold Thr is again corrected to one lower level at the end of the asynchronous period according to the result of "learning" during this period (both correction flags 1 and 2 are set).

Therefore, during the antilock brake suppression which starts from time $t_8$, the maximum slip Sp during the asynchronous period is controlled to an appropriate value (a value between the first and second predetermined values $Sp_1$ and $Sp_2$).

Furthermore, while not shown in FIG. 3, if the maximum slip Sp during the asynchronous period is less than the first predetermined value $Sp_1$, the slip threshold Thr will be increased one level at the end of the asynchronous period according to the "learned" result (both correction flags 1 and are reset) from the asynchronous period.

Figure 4:
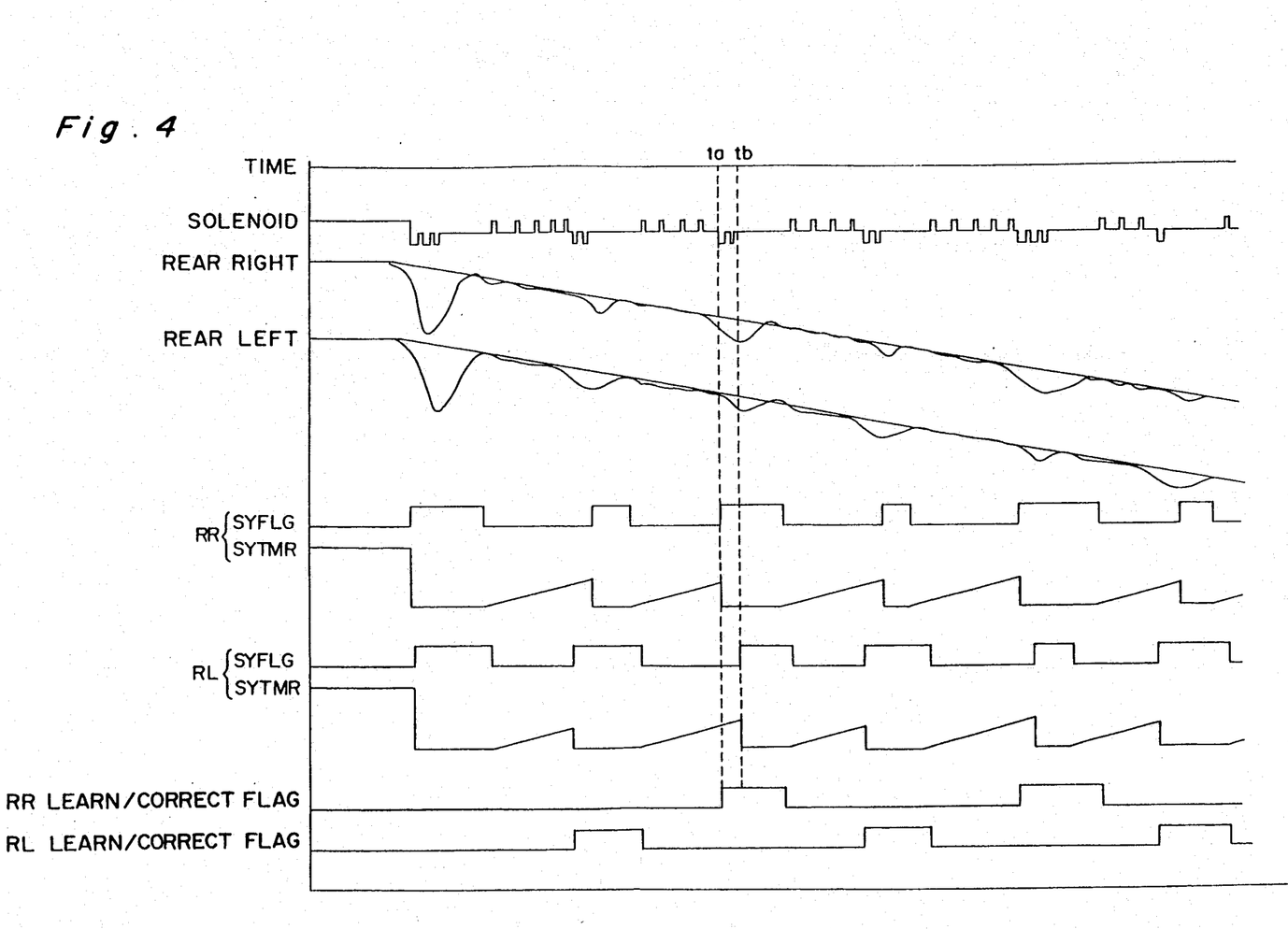
FIG. 4 is a waveform diagram of that case in which antilock brake control is applied to the rear wheels.

FIG. 4 is a graph illustrating those cases in which the learning and correction enable flag is set and is not set simultaneously with the start f antilock brake control for each of the rear wheels subject to select low control. At time Ta the right rear wheel is determined to show locking symptoms at Step #18; because the synchronized flag SYFLG is reset for the right rear wheel at this time, control passes through Steps #22 and #23 and advances to #24. Furthermore, because the synchronized flag SYFLG is also reset for the left rear wheel at this time, the procedure advances to Step #25 and #26 and the learning and correction enable flag is set.

Next at time tb the left rear wheel is determined to show locking symptoms at Step #18; because the synchronized flag SYFLG is reset for the left rear wheel at this time, control passes through Steps #22 and #23 and advances to #24. However, because the synchronized flag SYFLG was already set for the other, i.e., right, rear wheel at the time the locking symptoms were detected for the left rear wheel, the procedure skips Step #25 and advances to Step #26. Thus, the learning and correction enable flag is not set for the left rear wheel for which antilock brake control started after that for the right rear wheel.

To maintain vehicle stability, if brake pressure suppression has already started for one rear wheel then brake pressure suppression is also started for the other rear wheel even if locking symptoms are not detected therefor because the evaluation of locking symptoms in both rear wheels subject to select low control is based on the wheel for which the locking symptoms are stronger. It is therefore sufficient to correct the slip threshold Thr based on only the first rear wheel showing evidence of slipping because the brake pressure suppression applied to the other rear wheel results from the wheel behavior of the first wheel, and Steps #23 and #24 are thus provided.

An antilock brake control system comprising a learning and correction function according to the present invention sets a threshold so that suppression of the brake pressure starts at a low slip level on road surfaces on which tire slipping increases easily, but learns and corrects the threshold so that antilock brake control only starts after the tires slip more than a relatively high slip level on road surfaces on which tire slipping does not increase easily. In other words, a device according to the present invention is constructed to change the conditions under which antilock brake control starts according to the increase in tire slipping on the currently travelled road surface, i.e., according to the properties of the currently travelled road surface as determined by the coefficient of friction thereof. Therefore, it is possible to keep the maximum level of tire slipping to within an optimized range even when the condition of the road surface varies as on asphalt, gravel, or snow-covered roads, and it is thus possible to maintain vehicle stability and high braking efficiency when the brakes are applied.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An antilock brake control system having a learning and correction function, comprising:
    means for outputting a slip value representing a slipping of a tire with respect to a road surface;
    means for outputting a slip threshold;
    means for comparing said slip value with said slip threshold and for producing a locking symptom signal when said slip value exceeds said slip threshold;
    means for starting a brake pressure suppression when said locking symptom signal is produced;
    a slippage learning means for learning, during a learning period from said start of said brake pressure suppression until said tire stabilizes, whether a maximum of said slip value during said learning period is one of being within a predetermined range, being greater than said predetermined range, or being less than said predetermined range; and
    means for correcting said slip threshold, such that, when said maximum slip value is greater than said predetermined range, said slip threshold is decreased, and when said maximum slip value is less than said predetermined range, said slip threshold is increased.

2. The antilock brake control system of claim 1, wherein said slip threshold correction means performs said correction after said learning period has ended.

3. The antilock brake control system of claim 1, wherein said comparing means and said brake pressure suppression starting means are provided for a pair of rear wheels, said locking symptom signal being based on a wheel behavior of one of said pair of rear wheels, such that a locking symptom of one of said pair of rear wheels that is stronger than the other of said pair simultaneously starts said brake pressure suppression for both wheels.

4. The antilock brake control system of claim 3, wherein a correction by said slip threshold correction means is not applied to a rear wheel for which a second learning period started later if said learning periods of both rear wheels overlap by any amount.

5. An antilock brake control system having a learning and correction function, comprising:
    means for comparing a slip value representing a slippage of a tire with a preset slip threshold value;
    means for starting a brake pressure suppression when said comparing means determines that said slip value exceeds said preset slip threshold value;
    means for adjusting said slip threshold based upon a comparison between a maximum slip value and a predetermined range during a learning period that runs from said start of said brake pressure suppression until said tire stabilizes.

6. An antilock brake control system, comprising:
    a brake for stopping a rotation of a wheel;
    a sensor that outputs a slip value representing a slipping of said wheel with respect to a road surface;
    a comparer that compares said slip value with a slip threshold;
    an actuator that varies a brake pressure applied to said brake in response to a signal from said comparer; and
    a learning and correcting unit that functions during a learning period from when said brake pressure is varied to when said wheel stops slipping to determine a maximum slip value during said learning period, said learning and correcting unit decreasing said slip threshold when said maximum slip value is greater than a predetermined range, while increasing said slip threshold when said maximum slip value is less than said predetermined range.

7. The antilock brake control system of claim 6, wherein said learning and correcting unit comprises a processor.

* * * * *

UNITED STATES PATENT AND TRADEMARK OFFICE
CERTIFICATE OF CORRECTION

PATENT NO. : 5,228,758
DATED : July 20, 1993
INVENTOR(S) : H. FUJIOKA et al.

It is certified that error appears in the above-indentified patent and that said Letters Patent is hereby corrected as shown below:

```
     At column 1, line 14 change "ar" to ---are---.
     At column 1, line 58 delete "5".
     At column 3, line 29 change "Ws:" to ---Ws₁---.
     At column 4, line 21 insert ---return in Figs. 2a and 2b is the
sequence applied to one tire.--- after "to".
     At column 5, line 15 insert ---1--- after "flag".
     At column 6, line 48 change "t" to ---t₁---.
     At column 7, line 16 insert ---flag SYFLG is set at Step #21, the
asynchronous period--- after "synchronized".
     At column 7, line 18 delete "15".
     At column 7, line 58 change "ta" to ---tr---.
     At column 8, line 6 insert ---1--- before "and".
     At column 8, lines 42-43 delete the spacing between "pressure" and
"suppression".
     At column 8, line 43 change "t:" to ---tr---.
     At column 8, line 63 change "f" to ---of---.
     At column 10, line 26 (claim 3, line 6) delete "such that".
```

Signed and Sealed this

Seventeenth Day of October, 1995

BRUCE LEHMAN

Attest:

Attesting Officer

Commissioner of Patents and Trademarks